United States Patent Office 3,440,213
Patented Apr. 22, 1969

3,440,213
VINYL HALIDE RESINS STABILIZED WITH TRIBASIC LEAD ISOPHTHALATE
Leonard M. Kebrich, Miller Place, N.Y. and Edward L. White,, Freehold, N.J., assignors to National Lead Company, New York, N.Y., a corporation of New Jersey
No Drawing. Original application Apr. 8, 1964, Ser. No. 358,373, now Patent No. 3,355,471, dated Nov. 28, 1967. Divided and this application Apr. 3, 1967, Ser. No. 643,766
Int. Cl. C08f 45/54; C08g 51/62
U.S. Cl. 260—45.75
1 Claim

ABSTRACT OF THE DISCLOSURE

Vinyl resins stabilized with tribasic lead isophthalate or tribasic lead isophthalate together with a conventional metal salt or organic stabilizer.

---

This is a division of application Ser. No. 358,373, filed Apr. 8, 1964 now matured into U.S. Patent No. 3,355,471.

This invention relates to basic lead salts of isophthalic acid and to a process for making such salts. This invention further relates to vinyl resin compositions stabilized against the action of heat with basic lead isophthalates.

It is well known that vinyl resin compositions are sensitive to the action of heat and that the acid degradation products produced by such action react to effect deterioration of the resin composition. This deterioration, primarily evidenced by color changes in the resin composition, which are in themselves undesirable, also seriously affects that electrical characteristics of the resin and ultimately flexibility and tensile strength. Since the resin compositions are necessarily exposed to heat during compounding and processing it is desirable to incorporate therein agents which tend to stabilize the physical and electrical properties of the resin composition.

The art has been aware of certain lead salts of phthalic acid as stabilizers for vinyl and related polymers. While the monobasic lead phthalate has been known, the dibasic salt has been the agent most frequently selected for stabilizing the vinyl composition. While such basic lead salts have been quite successful as stabilizing agents, and have gained commercial acceptance, there nevertheless exists a demand for new materials capable of imparting to the vinyl composition higher degrees of protection against the deleterious effects of heat.

It is, therefore, an object of this invention to provide a novel basic lead isophthalate, previously unknown to the art. Another object is to provide an improved stabilizer for vinyl resins. Another object is to provide a process for preparing the novel basic lead isophthalate. Still another object is to provide an improved vinyl resin composition stabilized against the effects of heat. Yet another object is to provide stabilized vinyl resin compositions of high electrical resistivity. Other objects and advantages will become apparent from the following more complete descriptions and claims.

Broadly, this invention contemplates, as a new chemical compound, tribasic lead isophthalate.

This invention also contemplates a vinyl resin composition comprising, as stabilizer therefor, tribasic lead isophthalate.

According to this invention, it has been discovered that isophthalic acid may be reacted with lead oxide so as to form a tribasic lead salt. The new tribasic lead salt corresponds to the formula $3PbO \cdot PbC_6H_4(COO)_2$. This is surprising in view of the fact that orthophthalic acid has been found to be capable of forming only the mono and dibasic lead salts, the latter being a commercially known stabilizer sold under the trademark "Dythal."

The new tribasic lead salt may be prepared by reacting one mol of isophthalic acid with four mols of lead oxide in the presence of water. In a preferred method of operation a water slurry of lead oxide is prepared to which is added isophthalic acid. The lead oxide slurry may be heated prior to or subsequent to the addition of the acid. The acid may be added slowly over a period of several hours or it may be added rapidly to the lead oxide slurry.

It is generally preferable, although not necessary, to add a small amount of a solution catalyst, such as acetic acid, nitric acid, or some other acid catalyst, for the purpose of accelerating the formation of the basic lead salt. The amount of the catalytic agent employed may vary, the usual amount being from 0.10 to 0.15 pound per 100 pounds of lead oxide.

Further, the process may be conducted at temperatures ranging from about 15° C. to about 100° C. but it is preferred to operate at temperatures between about 75° C. and 95° C.

It has further been found that the incorporation of the new tribasic lead salt in a vinyl resin provides a good degree of heat stabilization, with substantially no impairment of the inherent electrical resistivity of the resin. Moreover, after the degradation of the resin has begun, the stabilizing action of this salt is exerted in such a way that the resistivity of the composition is maintained at a high level.

Tribasic lead isophthalate, are prepared above, may or may not contain water of crystallization. The amount of combined water can be reduced or eliminated by extended drying of the product. In either event, whether or not combined water is present in the product, substantially no difference in stabilizing properties has been detected and the resinous composition reflects the same high degree of heat and electrical stabilization.

While tribasic lead isophthalate contributes a high degree of heat stabilization that is satisfactory for most purposes, it may sometimes be desirable to use other known stabilizers in conjunction therewith. For this purpose we may use conventional normal and basic lead salts, of which we mention basic carbonate of white lead or lead chlorosilicate, which would reduce total stabilizer costs, or dibasic lead phosphite which would provide improved light stability and weathering resistance to the vinyl resin composition. Further, lubricating stabilizers such as normal and dibasic lead stearate may be employed as processing aids and co-stabilizers. Alternatively, we have found that other conventional non-lead metallic salts and organic stabilizers may be used in combination with tribasic lead isophthalate to achieve exceptional heat stability or electrical properties. These co-stabilizers include barium and calcium stearates, polyhydroxy compounds, epoxides such as epoxidized soya oil and antioxidants such as bisphenol A. Further, the new tribasic lead salt may be coformed with other basic lead salts, such as with dibasic lead stearate. Other modifications include the surface coating of the new tribasic lead salt with paraffinic hydrocarbons or fatty acids, such as stearic acid.

Tribasic lead isophthalate and, if desired, the other co-stabilizers mentioned above may be added to the resin individually or together and may be introduced at any desired stage of manufacture. Preferably, we add the stabilizing component before or during the milling or the initial mixing of the ingredients of the resin batch. It has been found that the new tribasic lead salt disperses readily in the mixture of vinyl resin and other compounding agents so that a uniform dispersion is easily obtained. After mixing, the ingredients are fluxed and homogenized on a mill at conventional temperatures.

The new lead salt and the other co-stabilizers, if used, should preferably be present in total amount between 0.05% and 20% by weight, based on the resin. Amounts lower than 0.5% of the new lead salt when utilized as the sole stabilizer may be used with beneficial effect, but do not in general exert sufficient stabilizing action to provide commercially acceptable resinous compositions unless other stabilizers are used in conjunction therewith. Within the stated range, optimism results are usually obtained using amounts of tribasic lead isophthalate, or if other stabilizers are used therewith, amounts of total stabilizer ranging between 0.5% of 7% based on the weight of the resin. Where the other stabilizer is, for example, a metal salt, such as a barium or lead salt, there is preferably present from .01 to 10 parts of such co-stabilizer for every 1 part by weight of the new tribasic lead salt. These other metal salts may be normal or basic salts.

By the term vinyl resin we means to include the various vinyl resin compounds and combinations known to the art, including vinyl halides such as polyvinyl chloride; polyvinyl dichloride; vinyl resins produced by copolymerizing a vinyl halide with vinyl acetate or other vinyl esters; vinyl resins produced by copolymerization with an acrylic compound such as methyl or ethyl methacrylate; vinylidene halides and vinylvinylidene halide copolymers.

In order to illustrate more fully the nature of this invention and the manner of practicing the same, the following examples are presented.

EXAMPLE I 86.74 grams of lead monoxide were slurried in 550 cc. of water and heated to 88° C. A second slurry, consisting of 16.26 grams of 99.27% isophthalic acid in 300 cc. of water, heated to a temperature of about 95° C. was added to the lead monoxide slurry over a period of 3 minutes. The combined slurries were stirred for 1 hour at a temperature ranging from 88 to 95° C. At the completion of the reaction the slurry became white and the liquid phase had a pH value of 8.6 when cooled to 30° C. The product, tribasic lead isophthalate, was filtered, dried at 95° C. and ground. The yield was 102.4 grams.

EXAMPLE II

Tribasic lead isophthalate was prepared by forming a slurry of 166.9 grams of lead monoxide, 950 cc. of water and 50 cc. of a 1% acetic acid solution which slurry was heated to 90° C. To this slurry there was added, over a period of five hours, while maintaining the slurry temperature at 90° C., 30.8 grams of isophthalic acid at the rate of 1.0 gram per 10 minutes. At the completion of the reaction the slurry color was white and the liquid phase had a pH value of 8.0. The product was filtered, dried at 95° C. and hammer milled. Analysis of the white product showed it to contain 83.26% PbO.

EXAMPLE III 100 parts by weight of polyvinyl chloride resin were mixed with 50 parts of dioctyl phthalate plasticizer and 0.25 parts of dibasic lead stearate; five parts of tribasic lead isophthalate were added to this composition. Mixing and fluxing were accomplished in a four-minute cycle on a two-roll mill of the conventional type heated to a temperature of 300° F. The plastic composition was removed from the mill in the form of a sheet of 0.040 inch thickness.

For purposes of comparison, a second batch was prepared and processed in the identical manner, except that five parts of dibasic lead orthophthalate, a well-known stabilizer individually used in electrical compositions, was substituted for the tribasic lead isophthalate.

The heat stability of each of the above compositions was determined by visual observation of the color of the specimen after heating in a closed mold positioned between the platens of a steam heated press for periods of 15 and 30 minutes at a temperature of 350° F. The heat stability of the sheet stabilized with tribasic lead isophthalate was superior to the composiiton stabilized with dibasic lead orthophthalate. After 15 minutes the color of the resinous composition containing the new basic lead salt was merely off-white and after 30 minutes was a light cream whereas the composition stabilized with dibasic lead orthophthalate was after 15 minutes light tan and after 30 minutes brown.

EXAMPLE IV 100 parts by weight of polyvinyl chloride resin were mixed with 50 parts of diisodecyl phthalate plasticizer and 0.25 part of a microcrystalline paraffin wax (melting point 165° F.). Five parts of tribasic lead isophthalate were added to this composition. A second composition was similarly formulated except that five parts of dibasic lead orthophthalate was substituted in place of the tribasic lead isophthalate. The compounds were mill processed into 0.040-inch sheets as discussed above.

Electrical volume resistivity measurements were made at 70° C. on specimens of each composition after conditioning in an oven at 70° C. for 30 minutes. The volume resistivity of the composition stabilized with tribasic lead isophthalate was $1.6 \times 10^{12}$ ohm-cm., whereas that of the control specimen stabilized with dibasic lead orthophthalate was only $0.7 \times 10^{12}$ ohm-cm. Thus, the new stabilizer provided more than 2-fold improvement over dibasic lead orthophthalate, a commercial stabilizer having very good electrical properties.

EXAMPLE V 100 parts by weight of polyvinyl chloride resin were mixed with 50 parts of dioctylphthalate plasticizer and five parts by weight of a stabilizer system composed of 90% tribasic lead isophthalate and 10% barium stearate. A second composition wherein the tribasic lead salt was replaced with an equal amount of dibasic lead orthophthalate was also prepared as a control stock. The volume resistivity measurements and heat stability tests were performed on mill processed sheets in the same manner as described in the preceding examples. The resinous compositions containing the new tribasic lead salt provided a greater than 2-fold improvement in volume resistivity and superior heat stability than that of the control sample containing dibasic lead orthophthalate.

The foregoing examples, for purposes of comparison, all employed polyvinyl chloride to illustrate specific embodiments of this invention. It will be understood that a variety of vinyl halide resins, along with alternative plasticizers, and coloring and modifying agents, may be present without significantly effecting the stabilization accomplished, and that the favorable results obtained are characteristic of those obtained with vinyl resin compositions in general.

While this invention has been described and illustrated by the examples shown, it is not intended to be strictly limited thereto and modifications may be employed within the limits of the following claim.

We claim:
1. A resinous composition comprising a vinyl halide resin and tribasic lead isophthalate as stabilizer therefor, said stabilizer being present in an amount of from 0.05% to 20% based on the weight of the resin.

References Cited

UNITED STATES PATENTS

| | | | |
|---|---|---|---|
| 2,269,990 | 1/1942 | Safford | 260—45.75 |
| 2,608,547 | 8/1952 | Hendricks et al. | 260—45.75 |
| 2,625,521 | 1/1953 | Fischer et al. | 260—23 |
| 2,912,397 | 11/1959 | Houska et al. | 260—23 |
| 3,106,539 | 10/1963 | Hendricks et al. | 260—23 |
| 3,245,926 | 4/1966 | Parker | 260—23 |
| 3,245,943 | 4/1966 | Barnes et al. | 260—31.8 |
| 3,245,948 | 4/1966 | Hendricks et al. | 260—45.75 |

DONALD E. CZAJA, *Primary Examiner.*

R. A. WHITE, *Assistant Examiner.*

U.S. Cl. X.R.

260—23